United States Patent
Pessin et al.

(10) Patent No.: US 9,650,860 B2
(45) Date of Patent: *May 16, 2017

(54) EXPANDABLE PACKER METHODS

(71) Applicant: Schlumberger Technology Corporation, Sugar Land, TX (US)

(72) Inventors: Jean-Louis Pessin, Paris (FR); Pierre-Yves Corre, Eu (FR); Guillaume Boutillon, Abbeville (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/923,262

(22) Filed: Oct. 26, 2015

(65) Prior Publication Data

US 2016/0047200 A1 Feb. 18, 2016

Related U.S. Application Data

(60) Division of application No. 13/209,548, filed on Aug. 15, 2011, now Pat. No. 9,175,776, which is a continuation of application No. 12/203,376, filed on Sep. 3, 2008, now Pat. No. 8,020,294.

(51) Int. Cl.
*E21B 33/128* (2006.01)
*E21B 33/127* (2006.01)
*F16J 15/46* (2006.01)
*E21B 23/06* (2006.01)

(52) U.S. Cl.
CPC .......... *E21B 33/1285* (2013.01); *E21B 23/06* (2013.01); *E21B 33/127* (2013.01); *F16J 15/46* (2013.01); *Y10T 29/4998* (2015.01); *Y10T 29/49297* (2015.01); *Y10T 29/49982* (2015.01)

(58) Field of Classification Search
CPC ...... E21B 33/12; E21B 33/127; E21B 33/128; F16J 15/46; F16J 15/01
See application file for complete search history.

(56) References Cited

U.S. PATENT DOCUMENTS

| | | | |
|---|---|---|---|
| 2,830,540 A * | 4/1958 | Vincent | ................. E21B 33/128 166/196 |
| 2,841,422 A | 7/1958 | Badger | |
| 2,942,666 A * | 6/1960 | Boer | ..................... E21B 33/127 166/120 |
| 2,942,667 A | 6/1960 | Blood et al. | |
| 3,456,723 A * | 7/1969 | Current | ............... E21B 33/1292 166/120 |
| 4,268,043 A | 5/1981 | Forssell | |
| 4,862,967 A | 9/1989 | Harris | |
| 6,581,682 B1 | 6/2003 | Parent et al. | |

(Continued)

OTHER PUBLICATIONS

French Search Report regarding corresponding application No. FR 0955955, dated Apr. 24, 2014, 8 pages.

*Primary Examiner* — Yong-Suk (Philip) Ro
(74) *Attorney, Agent, or Firm* — Michael Dae

(57) ABSTRACT

A technique involves a packer formed as an expandable packer with an internal expandable bladder. The expandable bladder is formed with a section that is radially enlarged relative to an axial end of the expandable bladder when the bladder is in a relaxed state. The bladder configuration enables use of a reduced expansion ratio while still allowing expansion of the packer to a desired large diameter.

9 Claims, 4 Drawing Sheets

(56) References Cited

U.S. PATENT DOCUMENTS

| | | |
|---|---|---|
| 7,320,367 B2 | 1/2008 | Brezinski et al. |
| 7,357,189 B2 | 4/2008 | Aldaz et al. |
| 7,363,970 B2 | 4/2008 | Corre et al. |
| 7,392,851 B2 | 7/2008 | Brennan et al. |
| 7,431,098 B2 | 10/2008 | Ohmer et al. |
| 7,458,252 B2 | 12/2008 | Freemark et al. |
| 7,458,419 B2 | 12/2008 | Nold, III et al. |
| 7,458,420 B2 | 12/2008 | Rioufol et al. |
| 7,461,695 B2 | 12/2008 | Boney et al. |
| 8,020,294 B2 | 9/2011 | Pessin et al. |
| 9,175,776 B2 | 11/2015 | Pessin et al. |
| 2004/0026092 A1* | 2/2004 | Divis ............... E21B 33/128 166/387 |
| 2004/0055758 A1 | 3/2004 | Brezinski et al. |
| 2005/0217869 A1 | 10/2005 | Doane et al. |
| 2007/0114017 A1 | 5/2007 | Brezinski et al. |

* cited by examiner

EXPANDABLE PACKER METHODS

RELATED APPLICATION

This application is a divisional application of and claims priority to U.S. patent application Ser. No. 13/209,548, entitled "EXPANDABLE PACKER CONSTRUCTION," filed Aug. 15, 2011, which is a continuation of U.S. patent application Ser. No. 12/203,376, now U.S. Pat. No. 8,020,294, entitled "METHOD OF CONSTRUCTING AN EXPANDABLE PACKER," filed Sep. 3, 2008, the entire disclosures of all of which are hereby incorporated herein by reference.

BACKGROUND

A variety of packers are used in wellbores to isolate specific wellbore regions. A packer is delivered downhole on a tubing string and a packer sealing element is expanded against the surrounding wellbore wall to isolate a region of the wellbore. Often, two or more packers can be used to isolate several regions in a variety of well related applications, including production applications, service applications and testing applications.

Some packers are constructed as inflatable packers that can be selectively inflated to form a seal in a wellbore. Inflatable packers generally are constructed on cylindrical mandrels by forming an inflatable bladder over a corresponding cylindrical mandrel to create a cylindrical bladder. The bladder is connected to metallic extremities and can be surrounded by additional layers. Inflation of the bladder causes expansion of the inflatable packer. However, the cylindrical, inflatable bladder either has a limited expansion ratio or requires use of materials that enable a greater expansion ratio. Materials that allow the greater expansion ratio can be susceptible to high temperatures, aggressive downhole fluids, and other factors that detrimentally affect the function and longevity of the packer.

SUMMARY

In general, the application is directed to methods for operating an expandable packer. In one embodiment, a method includes deploying a packer into a wellbore, the packer having an expandable bladder with a radially enlargeable midsection disposed between a first bladder end and a second bladder end. The method further includes expanding the packer in the wellbore such that an expanded diameter of the midsection of the bladder is greater than a diameter of the first bladder end and the second bladder end. The method also includes retracting the packer to a diameter less than the expanded diameter by applying an axial force along the packer with an auto retract mechanism.

BRIEF DESCRIPTION OF THE DRAWINGS

Certain embodiments of the invention will hereafter be described with reference to the accompanying drawings, wherein like reference numerals denote like elements, and.

DETAILED DESCRIPTION

In the following description, numerous details are set forth to provide an understanding of the present invention. However, it will be understood by those of ordinary skill in the art that the present invention may be practiced without these details and that numerous variations or modifications from the described embodiments may be possible.

The present invention generally relates to a system and method involving the creation of packers used to form seals within a wellbore. For example, many types of well production and treatment applications include isolating a specific region or regions along a wellbore. The isolated regions can be created by expanding one or more packers within the wellbore to separate regions along the wellbore with respect to each other.

In one embodiment, an expandable packer is formed with an expandable bladder that is created in a partially expanded configuration. In other words, the expandable bladder comprises a section of the bladder that extends in a radially outward direction when the expandable bladder is in a relaxed state. The system and methodology enable construction of a packer with a lower expansion ratio while still enabling expansion of the packer to the full diameters needed to form desired seals within the wellbore. The ability to construct a packer with lower expansion ratios ensures better packer performance, reduces the potential for wear and damage, and may allow the use of a greater variety of bladder materials and other packer component materials. The packer can be manufactured with a relatively large inner bladder diameter relative to the axial ends/extremities of the packer. The large diameter reduces bladder material elongation when the packer is expanded, e.g. inflated, thus reducing limitations otherwise caused by the diameter of the axial ends/extremities of the packer.

Figure 1:
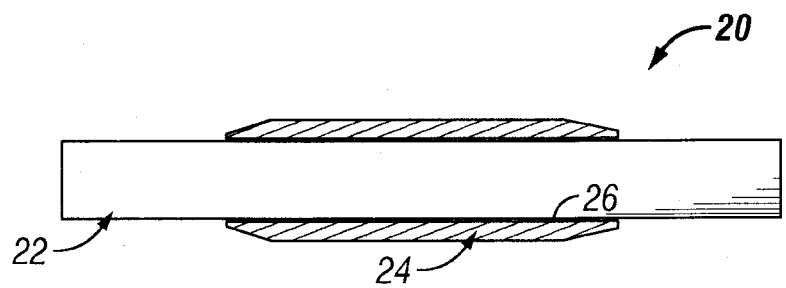
FIG. 1 is a front elevation view of a manufacturing mandrel and a radially expanded section, according to an embodiment of the present invention.

Referring generally to FIG. 1, one example of a multi-diameter mandrel 20 is illustrated. In this embodiment, multi-diameter mandrel 20 comprises a manufacturing mandrel 22 and a radially expanded section 24 disposed over the manufacturing mandrel 22. By way of example, the manufacturing mandrel 22 may be generally cylindrical in shape, and the radially expanded section 24 may have an internal passage 26 with a diameter selected to slidably receive the manufacturing mandrel 22. With the radially expanded section 24 positioned over manufacturing mandrel 22, the central diameter of multi-diameter mandrel 20 is larger than the diameters at its axial extremities.

Figure 2:
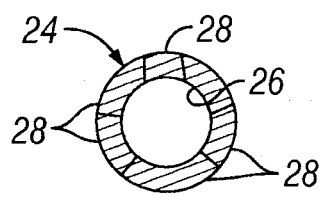
FIG. 2 is an end view of one example of the radially expanded section, according to an embodiment of the present invention.
Figure 3:
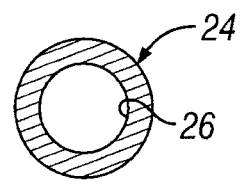
FIG. 3 is an end view of another example of the radially expanded section, according to an alternate embodiment of the present invention.

In FIGS. 2 and 3, examples are provided of radially expanded sections 24 that can be used to facilitate the construction of an expandable, e.g. inflatable, packer. In the example of FIG. 2, radially expanded section 24 is formed by combining rigid, solid segments or pieces 28 that can be separated and removed individually after construction of an expandable packer. By way of example, the segments 28 can be formed from metal materials, hard plastic materials, or other suitable materials. In an alternate embodiment illustrated in FIG. 3, radially expanded section 24 is constructed from a flexible material which can be flexed in a manner that facilitates removal after construction of the expandable packer. By way of example, the flexible, radially expanded section 24 may be formed from an elastomeric material that is resilient and allows flexing and bending.

Figure 4:
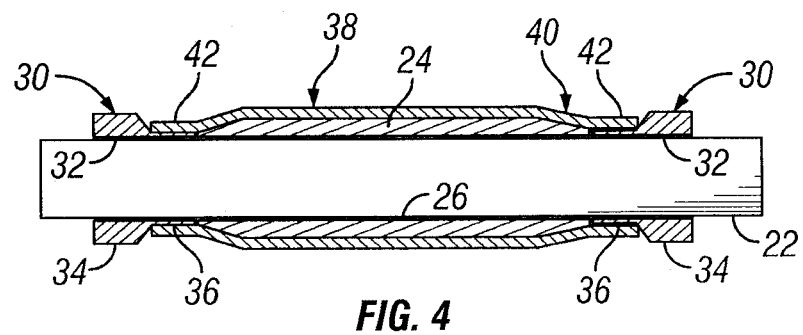
FIG. 4 is a front elevation view of an expandable bladder being formed over the manufacturing mandrel and the radially expanded section, according to an embodiment of the present invention.
Figure 5:
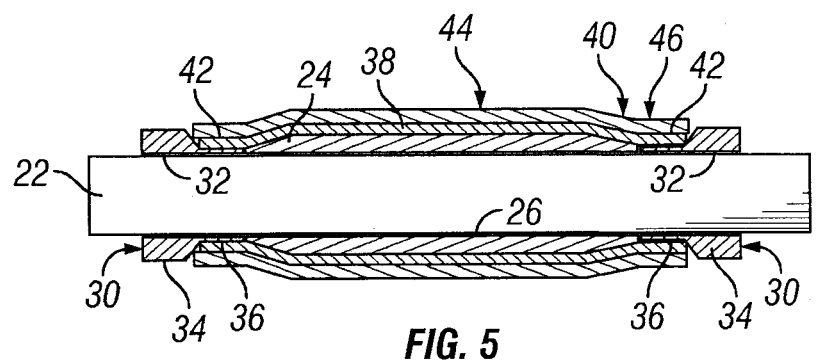
FIG. 5 is an illustration similar to that of FIG. 4 but including a mechanical structure mounted around the expandable bladder, according to an embodiment of the present invention.

Referring generally to FIG. 4, an example is provided of the initial stages of packer formation. In this example, a pair of packer extremities 30 is slid over the manufacturing mandrel 22 into proximity with radially expanded section 24. Each packer extremity 30 has a central passage 32 sized generally according to the diameter of manufacturing mandrel 22. Furthermore, each packer extremity 30 may comprise an axially outer thick section 34 and an axially inward thin section 36. The packer extremities 30 can be formed from a metal material. As illustrated, an expandable bladder 38 is formed over manufacturing mandrel 22 and radially expanded section 24 to create an expandable bladder 38 having a radially enlarged section 40 formed as a result of radially expanded section 24 of multi-diameter mandrel 20. The expandable bladder 38 may be generally tubular in shape with changing diameters along the tubular shape.

In the example illustrated, radially enlarged section 40 comprises a midsection bounded by bladder ends 42 that have a reduced diameter relative to radially enlarged section 40. Bladder ends 42 are designed to engage packer extremities 30 by, for example, being formed over the thin sections 36 of packer extremities 30. Depending on the material used to form expandable bladder 38, the formation process can vary. By way of example, expandable bladder 38 may be molded over manufacturing mandrel 22, radially expanded section 24, and thin sections 36; however other formation techniques can be used to create the expandable bladder 38, such as injection molding, compression molding and/or curing among other techniques. In some embodiments, materials used to form expandable bladder 38 include elastomeric materials, such as a variety of synthetic rubber materials and other rubber materials or mixtures of materials. In other embodiments, materials used to form expandable bladder 38 include an oil resistant rubber, such as NBR (Nitrile Butadiene Rubber), HNBR (Hydrogenated Nitrile Butadiene Rubber) and/or FKM (Fluoroelastomers). In a specific high performance desired application, the expandable bladder 38 is constructed of a high acrylonytrile HNBR rubber, such as an HNBR rubber having a percentage of acrylonytrile in the range of approximately 21 to approximately 49%. The use of manufacturing mandrel 22 and radially expanded section 24 enables creation of a radially enlarged section, e.g. section 40, that remains in its radially enlarged configuration when the bladder is in a relaxed, non-stressed state. As a result, when the packer 46 is inflated to a given diameter, the expansion ratio of inner, expandable bladder 38 is significantly reduced. The reduced expansion ratio can significantly enhance the performance of packer 46 by enabling selection of bladder materials more resistant to high temperatures, aggressive fluids, or other subterranean, well-related factors.

After forming expandable bladder 38 over manufacturing mandrel 22 and radially expanded section 24, a mechanical structure 44 may be mounted around the expandable bladder 38 to create an expandable packer 46. Depending on the desired applications for expandable packer 46 and the environments in which packer 46 is to be utilized, the configuration and materials of mechanical structure 44 can vary. For example, mechanical structure 44 may comprise individual or multiple layers. In some applications, mechanical structure 44 may comprise cables, slats, or other structures designed to enhance packer longevity and the formation of seals at desired wellbore locations. Additional layers also can be incorporated within mechanical structure 44 or along the exterior of mechanical structure 44. For example, mechanical structure 44 may include or be combined with an outer layer of seal material, such as a rubber material.

Figure 6:
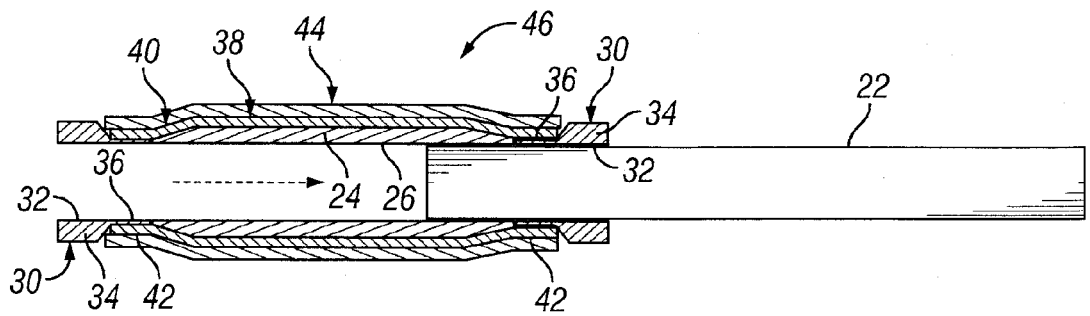
FIG. 6 is an illustration similar to that of FIG. 5 but showing the manufacturing mandrel being withdrawn, according to an embodiment of the present invention.
Figure 7:
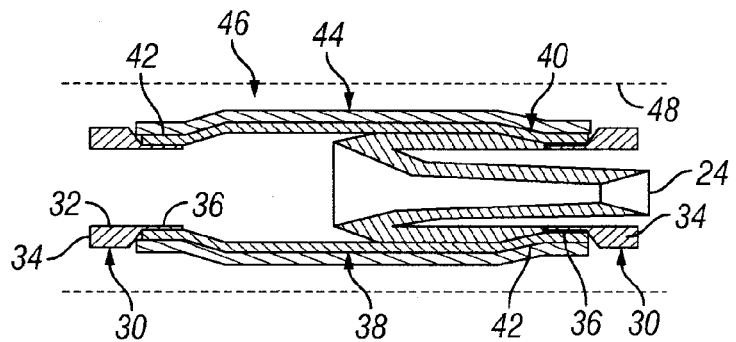
FIG. 7 is an illustration similar to that of FIG. 5 but showing the radially expanded section being withdrawn, according to an embodiment of the present invention.

After constructing packer 46 over manufacturing mandrel 22 and radially expanded section 24, manufacturing mandrel 22 can be removed, as illustrated in FIG. 6. As illustrated, manufacturing mandrel 22 is slid out of radially expanded section 24 along internal passage 26 and passages 32 of packer extremities 30 until the manufacturing mandrel is completely removed. Once the manufacturing mandrel 22 is removed, the radially expanded section 24 also is removed. If the radially expanded section 24 is formed from flexible, elastomeric material, the flexible material can be folded with an appropriate tool and removed through one of the packer extremities 30, as illustrated in FIG. 7. It should be noted that once radially expanded section 24 is removed, the packer 46 is ready for placement into a wellbore and for expansion into sealing engagement with a surrounding wall located in the wellbore. In FIG. 7, a wellbore wall 48 is illustrated schematically with dashed lines. Expansion of the packer 46 can be accomplished by inflating the packer with fluid introduced into the packer interior through passages in one of the packer extremities or through other suitable passages as with conventional inflatable packers.

Figure 8:
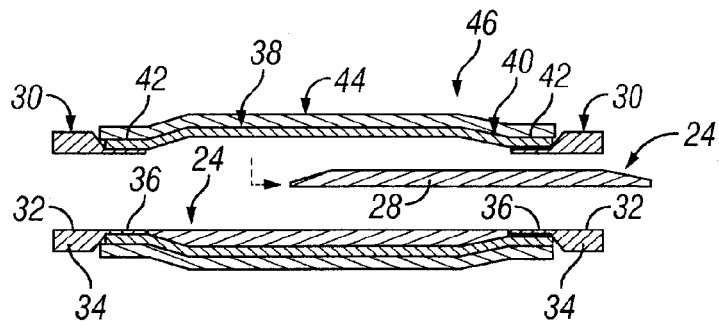
FIG. 8 is an illustration similar to that of FIG. 5 but showing another embodiment of the radially expanded section being withdrawn, according to an alternate embodiment of the present invention.
Figure 9:
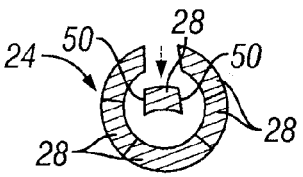
FIG. 9 is an end in view of the partially disassembled, radially expanded section illustrated in FIG. 8, according to an embodiment of the present invention.

If radially expanded section 24 is formed with rigid, solid segments 28, the individual pieces of the radially expanded section 24 can be separated, as illustrated in FIG. 8. The individual segments are then removed through passage 32 of one of the packer extremities 30. By way of example, one of the segments 28 can be formed with appropriately sloped side surfaces 50 that enable the manufacturing mandrel 22 to support the segments 28 in a generally cylindrical shape when mounted over the manufacturing mandrel 22. However, the angle of side surfaces 50 also allows the segment to move radially inwardly, as illustrated in FIG. 9, after the manufacturing mandrel 22 is removed. Once the initial segment is pulled through packer extremity 30, the subsequent segments 28 also can be disassembled and removed through the packer extremity 30.

Figure 10:
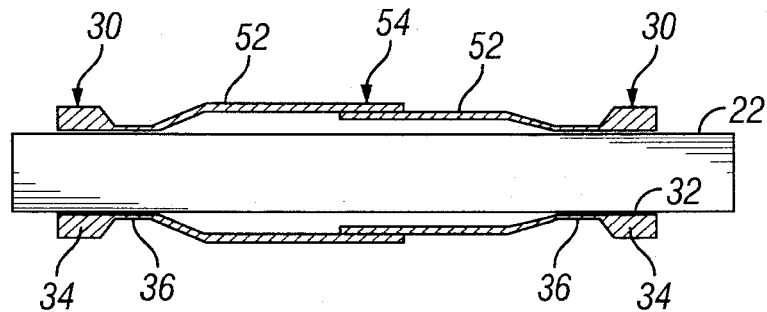
FIG. 10 is a front elevation view of a manufacturing mandrel with an inner packer structure mounted over the manufacturing mandrel, according to an alternate embodiment of the present invention.

Referring generally to FIG. 10, an alternate approach to constructing expandable packer 46 is illustrated. In this embodiment, packer extremities 30 are slid over manufacturing mandrel 22. However, instead of using a radially expanded section on the manufacturing mandrel, the packer extremities 30 are each coupled to or integrally formed with a radially flared extension 52. The flared extensions 52 are sized to create an overlapping region 54 when packer extremities 30 are slid a sufficient distance along manufacturing mandrel 22, as illustrated in FIG. 10.

Figure 11:
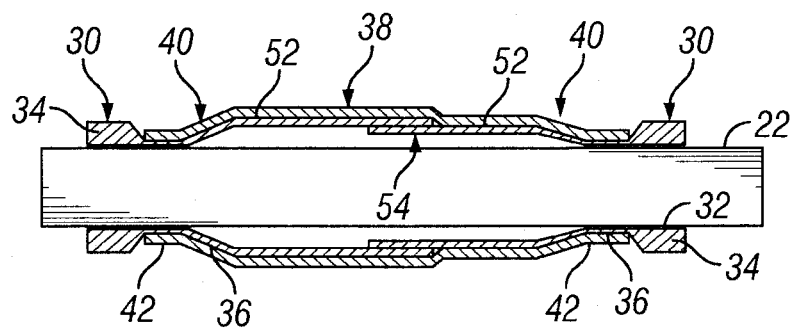
FIG. 11 is an illustration similar to that of FIG. 10 but showing an expandable bladder mounted over the inner packer structure, according to an embodiment of the present invention.

Once the flared extensions 52 are moved into the overlapping configuration, the expandable bladder is formed over the flared extensions 52 to create the expandable bladder 38 with radially enlarged section 40, as illustrated in FIG. 11. The radially enlarged section 40 is created as a result of the radially outward extension of flared extensions 52. In one embodiment, the flared extensions 52 are axially moveable relative to each other, allowing the bladder 38 to expand and contract during inflation and deflation of the bladder 38.

In the example illustrated, radially enlarged section 40 again comprises a midsection bounded by bladder ends 42 that have a reduced diameter relative to radially enlarged section 40. However, the radially enlarged section 40 could be positioned at other locations along the bladder 38, such as closer to or at one of the bladder ends. Bladder ends 42 are designed to engage packer extremities 30 by, for example, being formed over the thin sections 36 of packer extremities 30. The thin sections 36 can be positioned and constructed to serve as a link or connection between flared sections 52 and the corresponding thick sections 34 of packer extremities 30. As described above, a variety of expandable materials, for example elastomeric materials, such as rubber materials, synthetic rubbers and/or oil resistant rubbers, can be used to construct expandable bladder 38.

Figure 12:
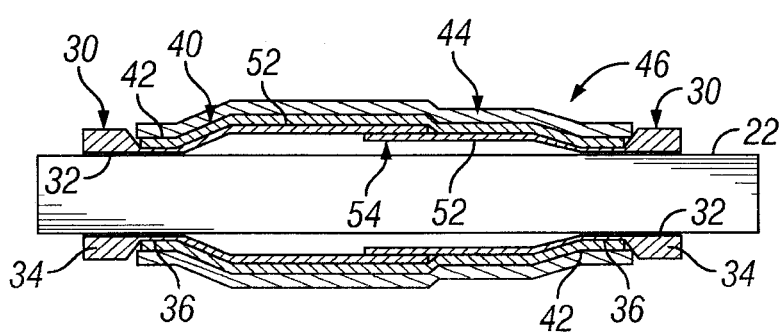
FIG. 12 is an illustration similar to that of FIG. 11 but with a mechanical structure mounted around the expandable bladder, according to an embodiment of the present invention.
Figure 13:
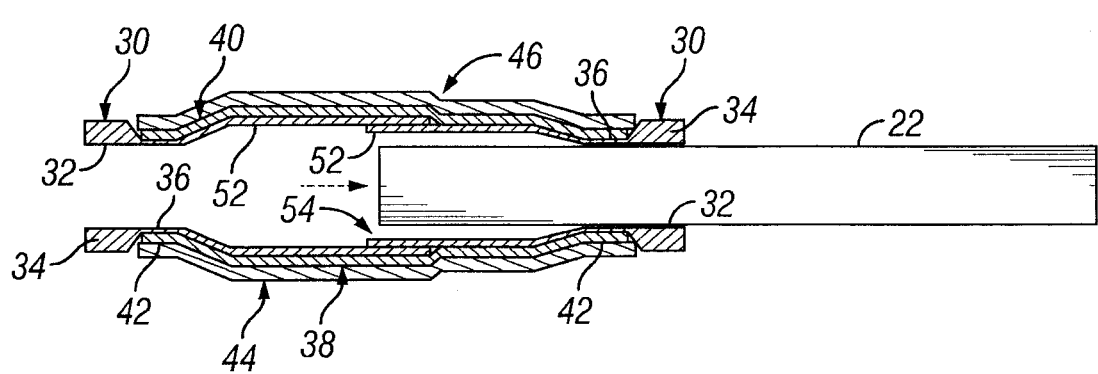
FIG. 13 is an illustration similar to that of FIG. 12 but showing the manufacturing mandrel being withdrawn, according to an embodiment of the present invention.

After forming expandable bladder 38 over manufacturing mandrel 22 and radially flared sections 52, the mechanical structure 44 is mounted around the expandable bladder 38 to create expandable packer 46, as illustrated in FIG. 12. The manufacturing mandrel 22 can then be removed, as illustrated in FIG. 13. The manufacturing mandrel 22 is pulled or pushed through passages 32 of packer extremities 30 until the manufacturing mandrel is completely removed from one axial end of the packer 46.

Figure 14:
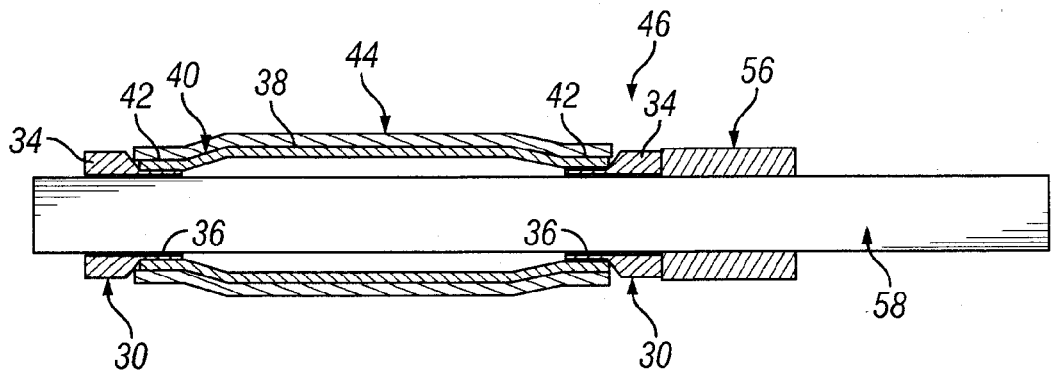
FIG. 14 is a front elevation view of a well tool with a packer structure mounted over the well tool, according to an alternate embodiment of the present invention.
Figure 15:
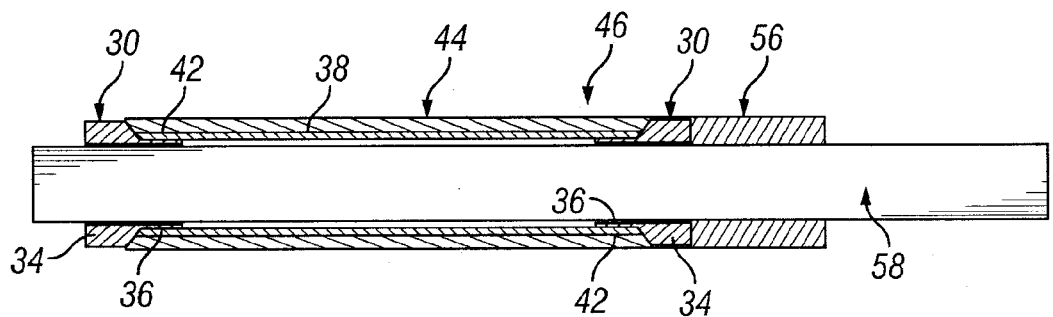
FIG. 15 is an illustration similar to that of FIG. 14 but showing the expandable bladder linearly extended to reduce the packer diameter, according to an embodiment of the present invention.

Referring generally to FIG. 14, another embodiment of expandable packer 46 is illustrated. In this embodiment, packer 46 further comprises an auto retract mechanism 56 used to apply an axial force along the packer. For example, auto retract mechanism 56 can be connected to the expandable bladder 38 through one or both packer extremities 30. In the example illustrated in FIG. 14, the auto retract mechanism 56 is mounted over a well tool 58 and connected to an axial end of the expandable bladder 38 through one of the packer extremities 30. The opposite packer extremity 30 is affixed to well tool 58. The auto retract mechanism 56 can be actuated or biased to apply an axially directed force to the packer 46 which forces the packer to deflate. Additionally, the auto retract mechanism 56 can be used to pull and elongate the expandable bladder 38 and packer 46 to a force induced reduction in diameter, as illustrated in FIG. 15. This enables the relaxed-state diameter of the packer 46 to be selectively decreased which not only further deflates the packer but also facilitates movement of the packer downhole or through restrictions.

By way of example, the auto retract mechanism 56 may comprise a piston actuator or a spring connected to packer extremity 30 and oriented to bias (or to enable actuation of) the expandable bladder 38 to its full lineal length, as illustrated in FIG. 15. Because the expandable bladder 38 and packer 46 are naturally in a semi-expanded state, the auto retract mechanism 56 can be designed so the overall packer 46, including mechanism 56, is not any longer than a conventional packer.

In some applications, the auto retract mechanism system can be designed so its external diameter allows it to fit within the inner diameter of the expandable bladder 38 after manufacturing. In this design, the auto retract mechanism is set during manufacturing and the overall packer assembly is simplified. When the packer 46 is forced to deflate by using the auto retract mechanism 56 to pull the packer in an axial direction, the expandable bladder is not deflated below its manufacturing diameter. In some embodiments, an anti-extrusion member can be positioned to cooperate with the auto retract mechanism 56 to prevent damage during packer deflation if the inner pressure within the packer is lowered below hydrostatic pressure.

Figure 16:
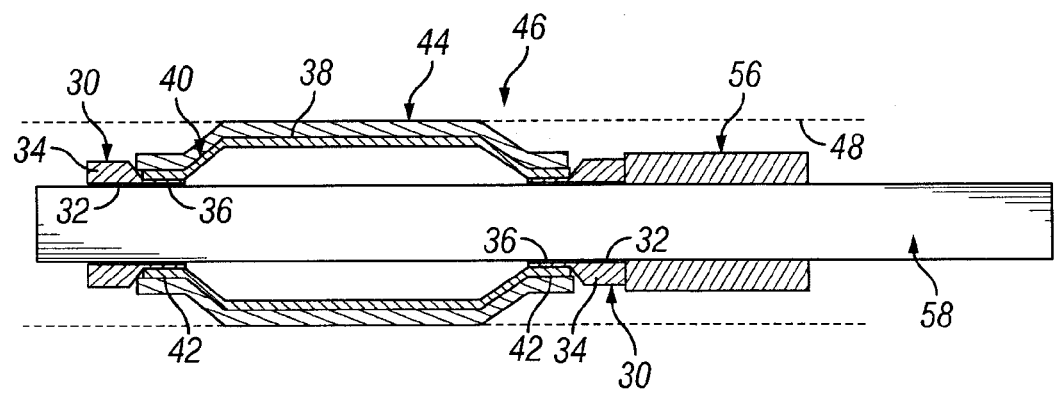
FIG. 16 is an illustration similar to that of FIG. 14 but showing the expandable packer in an expanded configuration, according to an embodiment of the present invention.

Regardless of whether the auto retract mechanism 56 is incorporated into the packer design, the expandable bladder 38 and overall packer 46 can be selectively expanded, e.g. inflated, into sealing engagement with a surrounding surface, such as wellbore wall surface 48, as illustrated in FIG. 16. The radially enlarged section 40 enables transition of the packer 46 into this sealing configuration with a reduced expansion ratio. In some applications, an embodiment of auto retract mechanism 56 is coupled to one of the packer extremities 30 to facilitate deflation of the packer and/or to transition the packer to a smaller diameter than the diameter of packer 46 when in a relaxed state.

In operation, the packer 46 can be mounted on the well tool 58, e.g. a tool string, for movement downhole to a desired well location before being set against a wellbore surface 48. The packer 46 can be mounted to well tool 58 by fixing one of the packer extremities 30, e.g. the upper extremity, with respect to the well tool which prevents the fixed packer extremity from moving during translation of the packer. The bottom packer extremity 30 is able to slide along the well tool 58 to allow axial shortening of the packer when the packer 46 is radially expanded. In some applications, auto retract mechanism 56 can be added to the packer and connected, for example, to the bottom extremity 30 of the packer 46 to enable forced deflation of the packer by applying a pulling force. If the auto retract mechanism is utilized, the stroke of the mechanism is selected to enable full inflation of packer 46.

Expandable packer 46 can be constructed in a variety of configurations for use in many environments and applications. For example, the packer 46 can be constructed in different diameters and lengths with many types of expandable bladders, mechanical structures, and other layers able to facilitate actuation of the packer and sealing of the packer at a desired wellbore location. Furthermore, the radially enlarged section 40 of expandable bladder 38 can be formed with different ratios relative to the diameter of one or more bladder ends 42. In some applications, the radially enlarged section 40 can be selected so the overall diameter of the packer at the radially enlarged section is relatively close to the diameter of the packer when fully inflated. Accordingly, the expansion ratio of the expandable bladder 38 can be reduced to various selected ratios depending on the desired packer applications and on the materials used in constructing bladder 38. By way of example, the radially enlarged section 40 can be selected so the material of expandable bladder 38 experiences half, or less than half, the expansion ratio otherwise required if radially enlarged section 40 is not incorporated into bladder 38. The various packer components and layers also can be constructed from a variety of materials and combinations of materials suitable for a given downhole application.

Accordingly, although only a few embodiments of the present invention have been described in detail above, those of ordinary skill in the art will readily appreciate that many modifications are possible without materially departing from the teachings of this invention. Such modifications are intended to be included within the scope of this invention as defined in the claims.

What is claimed is:

1. A method comprising:
deploying an inflatable packer into a wellbore, the inflatable packer having an expandable bladder with a radially enlargeable midsection disposed between a first bladder end and a second bladder end;
expanding the inflatable packer in the wellbore such that an expanded diameter of the midsection of the bladder is greater than a diameter of the first bladder end and the second bladder end; and
retracting the inflatable packer to a diameter less than the expanded diameter by applying an axial force along the inflatable packer with an auto retract mechanism.

2. The method of claim 1 wherein the auto retract mechanism is connect to the first bladder end or the second bladder end.

3. The method of claim 1 wherein the step of expanding the inflatable packer is accomplished at least in part with the auto retract mechanism.

4. The method of claim 1 wherein the step of retracting the inflatable packer reduces the diameter to less than the expanded diameter and less than a diameter of the inflatable packer at a relaxed state.

5. The method of claim 1 wherein the auto retract mechanism is a piston actuator and is connected to at least the first bladder end or the second bladder end.

6. The method of claim 1 wherein the auto retract mechanism is a spring connected to at least the first bladder end or the second bladder end.

7. The method of claim 1, further comprising connecting the expandable bladder to the auto retract mechanism for expansion and retraction of the expandable bladder.

8. The method of claim 1, wherein expanding the inflatable packer comprises inflating the inflatable packer with fluid introduced into the inflatable packer.

9. The method of claim 1, wherein each bladder end has a first diameter less than a second diameter of the inflatable bladder in a non-stressed state, wherein the second diameter is located between the first bladder end and the second bladder end.

* * * * *